Oct. 27, 1959     H. A. BING ET AL     2,910,573
PHOTOGRAPHIC BOUNCE FLASH ADAPTER
Filed March 26, 1956     2 Sheets-Sheet 1
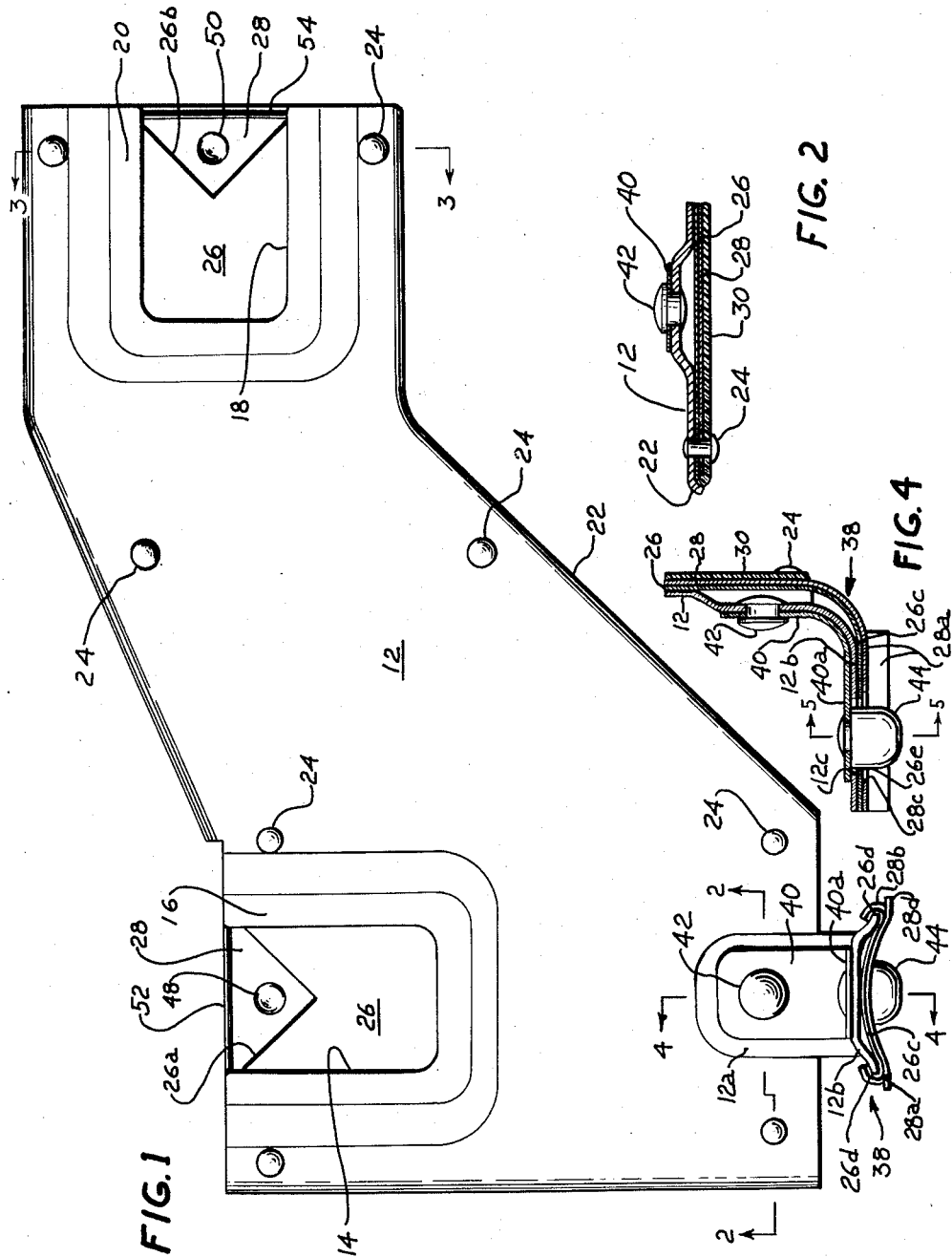
INVENTORS
Herbert A. Bing
and
BY John H. Lothrop
Brown and Mikulka
Attorneys

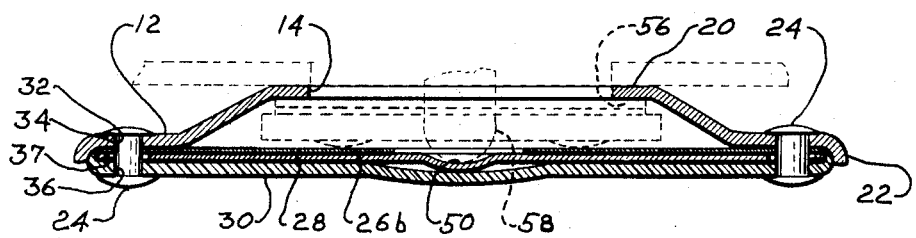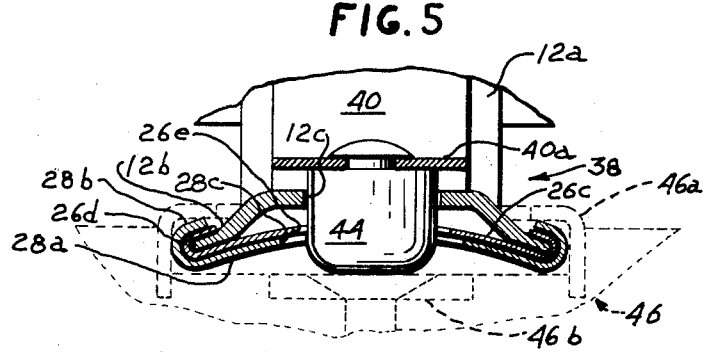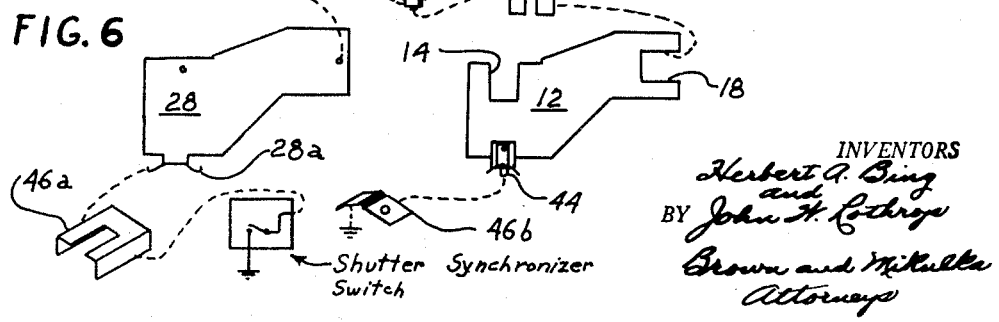

2,910,573

PHOTOGRAPHIC BOUNCE FLASH ADAPTER

Herbert A. Bing, Wellesley, and John W. Lothrop, Westwood, Mass., assignors to Polaroid Corporation, Cambridge, Mass., a corporation of Delaware Application March 26, 1956, Serial No. 573,936

5 Claims. (Cl. 240—1.3)

The present invention relates to photography and more particularly to an accessory for use with a flash gun and a camera in flash photography.

When, in photographing a subject, a flash gun is aimed directly at the subject, the resulting photograph may exhibit various undesirable qualities. For example, it may have a generally "flat" appearance. On the other hand, shadows may appear harsh and overly emphasized and objects near to the camera may be fully exposed or overexposed while those more distant may be underexposed. To overcome these disadvantages when, for example, using a flash gun indoors, it has increasingly become the practice to reflect or "bounce" the light toward the subject from a ceiling. This provides a softer, more diffused lighting of the subject and results in photographic prints free from the aforementioned defects. However, the requirement of aiming the flash gun in a direction other than toward the subject presents the difficulty of holding the camera in one hand and the flash gun in the other, an extremely awkward operation. The present invention is concerned with providing an adapter or bracket for holding a flash gun which obviates this difficulty and which possesses special structural and functional advantages for positioning the flash gun and for simplifying a triggering circuit therefor.

Accordingly, an object of the invention is to provide an adapter which may readily be mounted on the accessory receptacle of a camera and to which may equally readily be mounted a flash gun in a plurality of positions for indirect lighting of a subject.

Another object of the invention is to provide an adapter of the aforesaid type in which a composite structure serves both as a support for mounting a flash gun at a desired angle with respect to the optical axis of a camera and as a means for providing electrical connections between the flash gun and the camera, using support components of the adapter for conducting an electric current without the necessity of running wiring externally or internally of the adapter.

A further object of the invention is to provide an adapter of the character described having a receptacle for a flash gun which is similar to the accessory receptacle of the camera with which the adapter is to be used so that the flash gun mounting element can alternatively be inserted in the adapter receptacle or in the accessory receptacle.

Other objects include the provision of an adapter suitable for mounting a flash gun in a manner such that the latter will reflect light from a ceiling while the camera is positioned either for "vertical" or "horizontal" picture taking; and an adapter which is durable, compact, lightweight, relatively inexpensive and positive in operation.

Other objects of the invention will in part be obvious and will in part appear hereinafter.

The invention accordingly comprises an article of manufacture possessing the features, properties, and relation of elements which will be exemplified in the article hereinafter described and the scope of the application of which will be indicated in the claims.

For a fuller understanding of the nature and objects of the invention, reference should be had to the following detailed description taken in connection with the accompanying drawings wherein:

Figure 1 is a front elevational view of the bounce flash adapter as it would appear mounted on a camera positioned for "horizontal" picture taking;

Fig. 2 is a sectional view of elements of Fig. 1, taken along the line 2—2;

Fig. 3 is a sectional view of the adapter of Fig. 1, taken along the line 3—3, showing receptacle elements for receiving associated elements of a flash gun, the latter being indicated by the broken lines;

Fig. 4 is a sectional view of elements of Fig. 1, taken along the line 4—4;

Fig. 5 is a front view, partly in section, of elements shown at the lower part of Fig. 1 for connecting the adapter physically and electrically with associated elements of a camera, the latter being indicated by the broken lines; and Fig. 6 is a diagrammatic view illustrating the functional relation of the adapter with a flash gun and a camera.

The bounce flash adapter, shown in Fig. 1, is basically constructed of four metallic and non-metallic, generally flat, plate- or layer-like members held together in superposed, assembled relation. The front or facing member consists of a main or supporting plate 12 which includes a cut-out area or slot 14 substantially rectangular in shape and having a raised, surrounding rim or flange portion 16 extending inwardly from an edge of the plate in a given direction and a second, similarly shaped slot 18 having a raised, surrounding rim or flange portion 20 extending inwardly from another edge of the plate in a direction approximately at 90° with respect to the first-named slot. The above-described slots form, in part, receptacle means for slidably receiving the mounting element of a flash gun, one slot being used when the camera is held vertically and the other slot when the camera is held horizontally. Main plate 12 also constitutes one branch of the circuit connecting the flash gun with the synchronizer switch identified with the shutter actuating mechanism of the camera. Edge portions, such as edges 22, of the main plate are rolled over to partially engage the edges of underlying plate-like members, and rivets 24 are employed as fastening means at selected points to hold main plate 12 and other plate members in assembled relation.

A substantially coextensive intermediate insulating member 26 formed, for example, of "fish paper," and having cut-away portions 26a and 26b, is located immediately behind main plate 12. Insulating member 26 serves to electrically insulate main plate 12 from conductor plate 28, the latter being substantially coextensive with elements 12 and 26 and positioned directly behind insulating member 26. Conductor plate 28 constitutes the second branch of the circuit which connects the flash gun with the synchronizer switch which is identified with the shutter actuating mechanism of the camera.

A back insulating plate or cover 30 substantially coextensive with plate members 12, 26 and 28 and formed, for example, of any suitable dielectric material such as the plastic sheet material known by the trade name Styron, manufactured by Dow Chemical Co. of Midland, Michigan, is located immediately behind conductor plate 28. Back insulating plate 30 constitutes both a protective support and a positioning means which permits the employment of rivets 24 for holding the assembly together without establishing a short circuit between main plate 12 and conductor plate 28. As particularly shown in Fig. 3, rivet holes 32, 34 and 36 of the main plate 12, intermediate insulating member 26 and the back insulating plate 30, respectively, are preferably of identical diameter, provide a close fit with respect to the rivets 24 and are in exact alignment when plates 12, 26 and 30 are superposed in assembled relation. However, rivet hole 37, formed in the conductor plate 28, is of considerably larger diameter than holes 32, 34 and 36 so that when cover plate 30 is assembled with plates 12, 26 and 28 and rivets 24 are inserted through the aligned holes in the assembled plates, a clearance is thereby provided between the rivets and conductor plate 28 such that no short circuit can occur between plates 12 and 28. It is to be assumed that the thickness of back insulating plate 30 is sufficient to resist tearing or deformation of the rivet holes formed therein, a thickness of approximately .030 inch being suitable for the purpose. Insulating plate 30 also serves to completely shield the conductor plate from undesirable contact with some external metallic object and to prevent any possible short circuit between the main plate and the conductor plate which might energize the flash bulb, as, for example, through the rivet heads.

A bracket 38 for releasably attaching the bounce flash adapter to the accessory clip or receptacle of a camera and for providing electrical connections therewith is formed of outwardly extending portions of main plate 12, intermediate insulating member 26 and back insulating plate 30. To form bracket 38, an area of main plate 12 is contoured, thus forming a raised portion 12a which increases its rigidity. An extension 12b of this portion is bent outwardly at 90° relative to the principal plane of plate 12. An extension 26c of intermediate insulator 26 and an extension 28a of conductor plate 28 are similarly bent outwardly, the upturned edges 26d and 28b of extended plate portions 26c and 28a serving to hold said portions in assembled relation with main plate portion 12b while preventing contact of portion 12b with conductor plate portions 28a and 28b, thus obviating a short circuit between said portions.

Each of the outwardly extending plate portions 12b, 26c and 28a has an aperture formed therein, namely, apertures 12c, 26e and 28c, which are in generally aligned relation to form substantially one continuous aperture as illustrated in Figs. 4 and 5. A flat-type spring 40 is physically and electrically attached to area 12a of the main plate as by rivets 42, as shown in Fig. 2. A button contact 44 is attached to the outwardly extending part 40a of the spring and is adapted to move freely within apertures 12c, 26e and 28c when the contact 44 is subjected to pressure and spring portion 40a is thereby depressed. This operation is clearly illustrated in Fig. 5 in which the adapter bracket 38 is shown in contact with the accessory receptacle or clip 46 of a camera, the upturned conductor plate portions 28b being in contact with clip portions 46a of the camera receptacle and the button contact being in contact with the central contact 46b of the camera receptacle, causing depression of spring portion 40a. The button contact serves both as an electrical contact and as a detent for releasably locking the adapter to the camera receptacle when the former is slidably inserted in the latter. End portions 28d of extension 28a protrude laterally and serve as stops to insure proper insertion of bracket 38 in the camera receptacle.

As shown in Fig. 1, the cut-out slot-like elements 14 and 18 of the main plate, in conjunction with adjacent areas of intermediate insulating element 26 and conductor plate 28, the latter having depressed contacts 48 and 50 which serve as detent means, and preferably tapered edges 52 and 54, constitute receptacles or sockets of the bounce flash adapter adapted to receive a mounting element of a flash gun and to provide electrical connections therewith. It will be noted that cutaway portions 26a and 26b of insulating element 26 expose the depressed contact areas 48 and 50 which are for the purpose of establishing connection with contact means of the flash gun. Positioning of a flash gun mounting element having fixed contacts 56 and spring-biased contact 58 bearing against contacts 20 and 50, respectively, of the adapter receptacle is illustrated in Fig. 3.

Fig. 6 illustrates the physical and electrical interconnection of the above-described elements of the bounce flash adapter combined with components of a flash gun and camera to provide an operative system which may be considered as comprising a triggering circuit for the flash gun. It is to be understood that a charge exists across the condenser, said charge being continuously maintained by a battery (not shown) connected across points A and B. This charge is released across the flash bulb immediately upon closing of the shutter synchronizer switch.

A modification of bracket 38 contemplates the elimination of spring 40 and contact 44. These elements could be replaced by an adjustable screw inserted through extending plate portions 12b, 26c and 28a, portion 12b being provided with a threaded aperture for the purpose. The screw, when tightened, would provide a holding means and an electrical contact with respect to the accessory receptacle of the camera.

Since certain changes may be made in the above article without departing from the scope of the invention herein involved, it is intended that all matter contained in the above description or shown in the accompanying drawings shall be interpreted as illustrative and not in a limiting sense.

What is claimed is:

1. A substantially flat, plate-like adapter device for attaching a flash gun alternately in either of a pair of given fixed positions relative to a camera so as to provide that light from the flash gun is always directed upwardly at a given angle with respect to the optical axis of the camera, said device comprising plate-like support means having a principal planar surface, a pair of receptacle means so formed as to lie substantially in the plane of said plate-like support means and to alternately and differentially receive the mounting element of a flash gun in either of two fixed directions disposed substantially at 90° relative to one another and when thus mounting the flash gun to provide said upward direction of light from the flash gun with the camera held either in a vertical or a horizontal position detent means associated with said receptacle means for releasably engaging said mounting element of the flash gun, bracket means integral with said plate-like support means extending substantially at 90° with respect to said planar surface and adapted to be inserted in the accessory receptacle located on the exterior of a camera substantially in the plane of the camera casing, detent means associated with said bracket for releasably engaging said accessory receptacle of the camera, and means associated with said plate-like support means providing a pair of electrical connections between said receptacle means and said bracket means.

2. A flat, plate-like adapter device for attaching a flash gun in a given fixed position relative to a camera so as to provide that light from the flash gun is directed upwardly at a given angle with respect to the optical axis of the camera, said device comprising a composite plate member composed of a plurality of metallic and dielectric, substantially coextensive layers arranged in alternate, superposed relation, said metallic layers being adapted to conduct an electric current for at least triggering the flash gun, receptacle means electrically connected with the metallic layers of said composite plate member adapted to receive the mounting element of a flash gun and when thus mounting the flash gun to provide said direction of light from the flash gun with the camera held in either a vertical or a horizontal position, detent means associated with said receptacle means for releasably engaging said mounting element of the flash gun, bracket means integral with and extending substantially at 90° with respect to said plate member and adapted to be inserted in the accessory receptacle located on the exterior of the camera so as to hold said plate member outwardly from a side of said camera in a direction substantially at 90° relative to the optical axis of said camera, and detent means associated with said bracket for releasably engaging said accessory receptacle of the camera, said bracket means also being electrically connected with said metallic layers and, in turn, providing electrical contact with said accessory receptacle.

3. An adapter device for attaching a flash gun to a camera in either of a pair of given fixed positions so that the flash gun is directed upwardly when the camera is positioned for either vertical or horizontal picture taking and for providing electrical connections between said flash gun and camera, said device comprising a composite plate member constructed of a plurality of substantially coextensive components comprising a pair of metallic plate-like elements and a pair of dielectric elements, said elements being arranged in alternate and superposed relation, said metallic plate-like elements serving the dual function of supporting said flash gun and of acting as individual branches of an electrical circuit for triggering said flash gun and said dielectric elements serving to electrically insulate said metallic elements with respect to one another and from external objects, a plurality of metallic fastening means engaging one of said metallic plate-like elements and one of said dielectric elements while in out-of-contact relation with the other of said metallic elements, said fastening means serving to hold all of said metallic and dielectric elements in assembled relation, means forming a pair of receptacles from cut-away portions of one of said metallic plate-like elements, a surface of said second metallic plate-like element and one of said insulating elements, said receptacles being electrically connected with said plate-like element, extending substantially at 90° relative to one another in the plane of said plate member and being adapted to alternately receive the mounting element of a flash gun so as to establish electrical contact therewith, and bracket means integral with said plate member and extending angularly therefrom for insertion in the accessory receptacle of a camera so as to position said composite plate member of the adapter at a given angle with respect to the optical axis of the camera, said bracket means being electrically connected with said plate-like elements and, in turn, establishing electrical contact with said accessory receptacle.

4. A plate-like adapter device for attaching a flash gun to a camera which provides that light from the flash gun is directed upwardly regardless of whether the camera is held in vertical or horizontal position and constitutes electrical connections between the flash gun and camera, said device comprising a pair of metallic plate members in superposed assembled relation for supporting said flash gun and for conducting an electric current, insulating means electrically shielding one of said plate members from the other, means forming a pair of slot-like receptacles integral with relatively angularly disposed edges of said plate members substantially in the planes of the latter and extending inwardly therefrom in directions substantially at 90° relative to one another for alternately receiving the mounting element of a flash gun and establishing electrical contact therewith, bracket means integral with said plate members and extending substantially at 90° therefrom and adapted to be inserted in the accessory receptacle located on the exterior of a camera and to establish electrical contact therewith, and detent means associated with said bracket for releasably engaging said accessory receptacle of the camera, said pair of slot-like receptacles permitting selective mounting of the flash gun mounting element in either one of said receptacles when the camera is rotated through 90° for vertical or horizontal picture-taking so that the flash gun is invariably directed in an upward direction.

5. A substantially flat, plate-like adapter device for attaching a flash gun to a camera in spaced relation thereto, for aiming said flash gun in a direction other than that permitted by direct attachment of said flash gun to the accessory receptacle of said camera and for providing, of itself, a combined support means and electrical connections between said flash gun and camera, said device comprising a composite plate member composed of a plurality of metallic and dielectric layers arranged in alternate superimposed relation to form said plate-like construction, said metallic and dielectric layers principally constituting said support means and said metallic layers principally constituting said electrical connections and being adapted to conduct an electric current for triggering said flash gun, receptacle means electrically connected with the metallic layers of said composite plate member and adapted to receive and establish electrical contact with the mounting element of said flash gun, detent means associated with said receptacle means for releasably engaging said mounting element of the flash gun, bracket means extending angularly from said plate member and adapted to be inserted in said accessory receptacle of a camera, said bracket means also being electrically connected with said metallic layers and being adapted to establish electrical contact with said accessory receptacle.

References Cited in the file of this patent

UNITED STATES PATENTS

| | | |
|---|---|---|
| 2,282,850 | Brownscombe | May 12, 1942 |
| 2,441,489 | Jacobs | May 11, 1948 |
| 2,560,200 | Werzyn | July 10, 1951 |
| 2,721,929 | Schwartz et al. | Oct. 25, 1955 |

FOREIGN PATENTS

| | | |
|---|---|---|
| 373,360 | Great Britain | May 26, 1932 |
| 185,986 | Switzerland | Nov. 16, 1936 |
| 589,870 | Great Britain | July 2, 1947 |